United States Patent [19]
Engibarov

[11] Patent Number: 5,664,793
[45] Date of Patent: Sep. 9, 1997

[54] QUICK-CHANGE CHUCK JAWS

[76] Inventor: Eddy Engibarov, c/o E.Z.E. Machine Company, 616 Onderdonk Ave., Ridgewood, N.Y. 11385

[21] Appl. No.: 604,404

[22] Filed: Feb. 21, 1996

[51] Int. Cl.⁶ .................................................. B23B 31/16
[52] U.S. Cl. ........................ 279/124; 269/283; 279/153; 403/381
[58] Field of Search .............................. 279/123, 124, 279/152, 153; 403/381; 269/261, 280, 283

[56] References Cited

U.S. PATENT DOCUMENTS

| | | | |
|---|---|---|---|
| 3,021,149 | 2/1962 | Griffin | 279/123 |
| 3,090,086 | 5/1963 | Fata | 403/381 |
| 4,617,721 | 10/1986 | Jackson | 279/123 |
| 5,056,766 | 10/1991 | Engibarov | 269/136 |
| 5,060,920 | 10/1991 | Engibarov | 269/282 |

*Primary Examiner*—Steven C. Bishop
*Attorney, Agent, or Firm*—Helfgott & Karas, P.C.

[57] ABSTRACT

A chuck jaw assembly includes a base and a removable jaw. A tongue and groove interconnection is provided between the base and the jaw in the form of a longitudinally tapering dovetail. As the tongue is pushed along the groove, its sides are tightly wedged within the groove. At the same time, the tongue is pulled downwardly into the groove so as to firmly seat the jaw on the base.

15 Claims, 3 Drawing Sheets

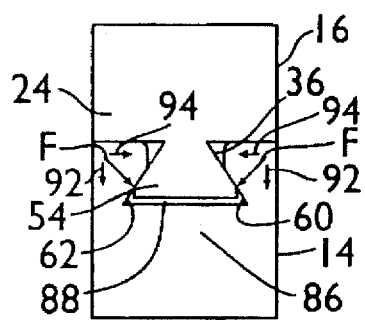
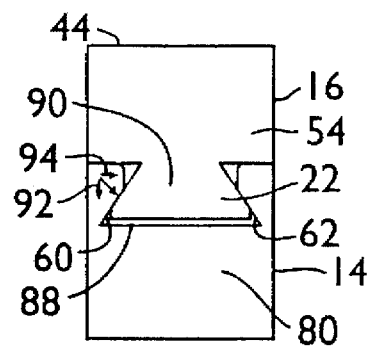
FIG. 14   FIG. 15
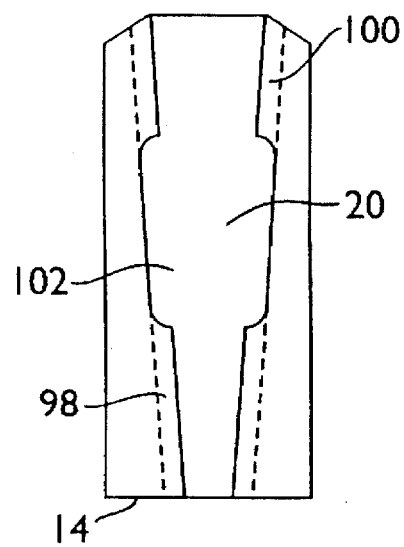
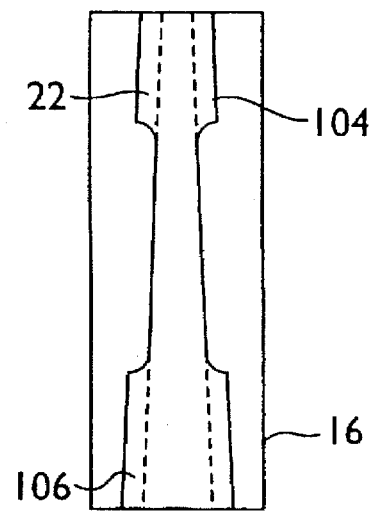
FIG. 16   FIG. 17
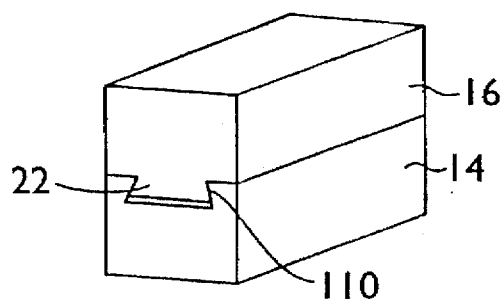
FIG. 18

QUICK-CHANGE CHUCK JAWS

BACKGROUND OF THE INVENTION

1. Field of the Invention

The present invention relates in general to workpiece holders for use with machine tools and relates in particular to a removable chuck jaw having a tapered dovetail connection for locking engagement with an adjustable jaw holder.

2. Description of Prior Developments

Chuck jaws for use on machine tools such as latches, CNC machines, and the like have been available for many years and have taken numerous configurations. Although these prior chuck jaws have performed satisfactorily, there is always an ongoing need for a simpler, stronger, more accurate and less expensive design. A particular need exists for such a chuck jaw known as a soft jaw.

Soft jaws are typically adjusted using manual force as opposed to the more expensive chuck jaws which are clamped using hydraulic force. Because of the limited manual force available for securely clamping soft jaws in place, it is especially desirable to achieve a strong, rigid, accurate, manually inserted interfit between a chuck jaw and its coacting jaw holder.

SUMMARY OF THE INVENTION

The present invention has been developed to fulfill the needs noted above and therefore has as an object the provision of a chuck jaw and jaw holder which are simple in design, inexpensive to manufacture and easy to operate.

Another object of the invention is the provision of a manually operated chuck jaw of the type commonly known as a "soft jaw" and which includes a tongue and groove interfit between the jaw and the jaw holder.

Still another object of the invention is the provision of a chuck jaw and jaw holder which define between them a double or compound tapered interfit which rigidly, accurately and securely mounts the jaw to the jaw holder with a simple manual operation.

Another object of the invention is to provide a chuck jaw which is mountable to its base solely by a frictional wedged interfit which does not require the use of any supplemental fasteners.

These and other objects are achieved in accordance with the present invention which includes a jaw holder having a longitudinally or radially tapered groove formed therein. The groove is preferably undercut along both side walls so as to form a tapered and dovetailed groove. The jaw, which slides into and out of the tapered dovetail groove, has a longitudinally or radially tapering dovetailed tongue which, when fully seated in the dovetailed groove with the application of a moderate, manually-applied sliding force, rigidly, accurately, fully secures the jaw on the jaw holder.

In a preferred embodiment, the wedged interfit between the tongue and groove is further tightened by the subsequent engagement of the jaw with a workpiece. In this case, no supplemental fastening is required to hold the jaw on its base. A simple impact with a hammer or the like is all that is required to unseat the jaw for removal and replacement.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 14 is a front end view of the jaw of FIG. 4 fully seated within the base of FIG. 10;

FIG. 15 is a front end view of FIG. 14;

FIG. 16 is a top plan view of an alternative embodiment of a base constructed in accordance with the invention;

FIG. 17 is a bottom plan view of a jaw adapted for use with the base of FIG. 16; and FIG. 18 is a view similar to FIG. 2 showing another embodiment of the invention.

In the various figures of the drawings, like reference characters designate like parts.

DETAILED DESCRIPTION OF THE PREFERRED EMBODIMENTS

The present invention will now be described in conjunction with the drawings, beginning with FIG. 1 which shows a conventional chuck 10 of the type used on lathes and other machine tools. Three separate jaw assemblies 12 constructed according to the present invention are mounted to the chuck 10 in a known manner such as by threaded fasteners. Each jaw assembly 12 is radially movable into and out of engagement with a workpiece or tool which is positioned centrally between the jaw assemblies according to standard machining practice.

Figure 1:
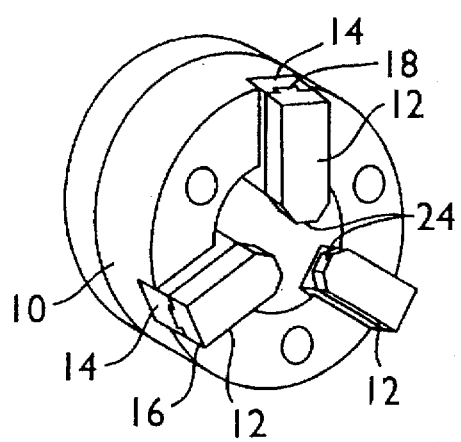
FIG. 1 is a perspective view of a three-jaw wedge-style chuck fitted with three chuck jaw assemblies, each constructed in accordance with the present invention.
Figure 2:
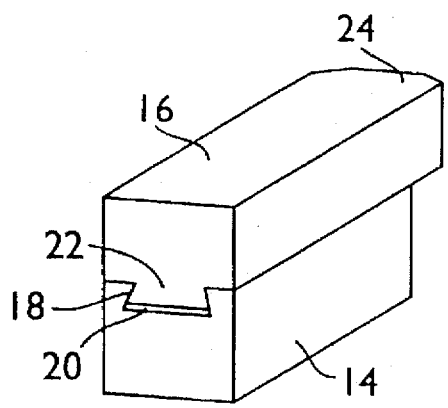
FIG. 2 is a perspective view of one of the chuck jaw assemblies of FIG. 1.

As further seen in FIGS. 1 and 2, each jaw assembly 12 includes a base 14 which is adapted to be individually and separately mounted to chuck 10. Each jaw assembly 12 also includes a jaw 16 which is removably mounted to base 14. A tongue and groove connection 18 is provided between the base 14 and jaw 16 for securely mounting the jaw on the base.

In the embodiment of FIGS. 1 and 2, base 14 is formed with a groove 20 and jaw 16 is formed with a tongue 22. It is, of course, possible to reverse the relative positions of the tongue and groove such that groove 20 is formed on jaw 16 and tongue 22 is formed on base 14. While jaws 16 in FIGS. 1 and 2 are depicted with chamfered or tapered workpiece engaging inner end portions 24, virtually any shape may be provided such as semicircular recessed end portions or simply rectangular end portions 24 shown in FIG. 3.

As seen in FIGS. 3 through 6, tongue 22 of jaw 16 projects outwardly from between a pair of coplanar abutment surfaces 26,28 formed on jaw 16. Abutment surface 26 extends generally perpendicular to side surface 30 and abutment surface 28 extends generally perpendicular to side surface 32. Surfaces 30 and 32 are preferably parallel to one another.

Tongue 22 is formed with a pair of longitudinally extending flat side walls 34,36 which diverge laterally from one another and away from abutment surfaces 26,28. Side walls 34,36 may be chamfered or relieved at their respective free ends 38,40. Each side wall 34,36 extends and projects away from its respective abutment surface 26,28 at an acute angle A (FIG. 4) and leads to a planar surface a base wall 42 which is parallel to abutment surfaces 26,28 and to opposed surface 44 so as to form a dovetail. Tongue 22 is preferably centered between side walls 30,32.

Figure 3:
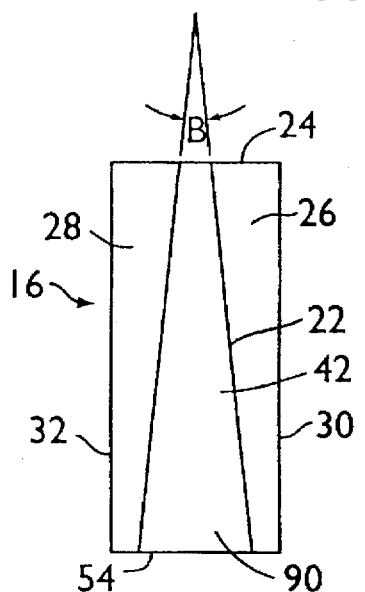
FIG. 3 is a bottom plan view of a jaw constructed in accordance with the invention and having a rectangular front portion.
Figure 4:
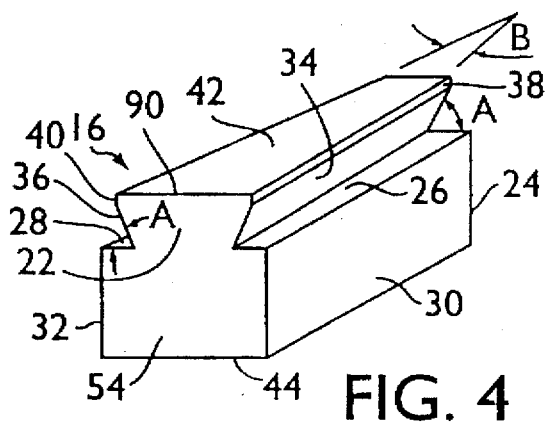
FIG. 4 is a perspective view of the jaw of FIG. 3.
Figure 5:
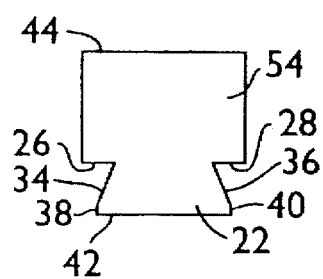
FIG. 5 is a rear end view of the jaw of FIG. 3.
Figure 6:
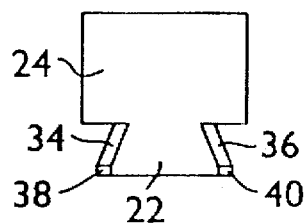
FIG. 6 is a front end view of the jaw of FIG. 3.
Figure 7:
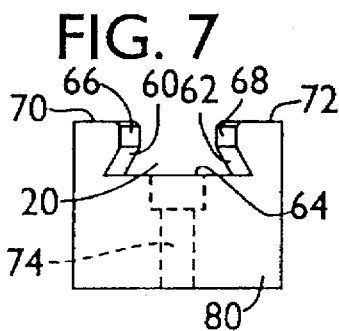
FIG. 7 is a rear end view of a base suitable for use with the jaw of FIGS. 1 and 2 or FIG. 3.
Figure 8:
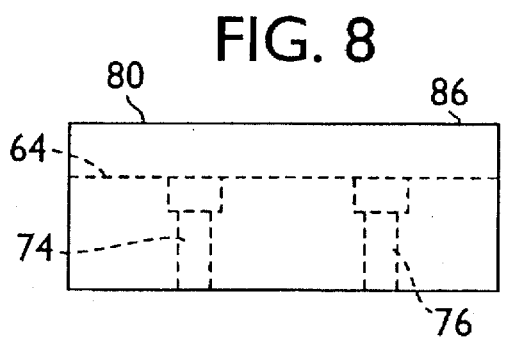
FIG. 8 is a right side elevation view of the base of FIG. 7.

A significant feature of the present invention is the provision of a compound or double wedge profile along tongue 22 which provides two separate wedge-driven centering and locking functions. This compound wedge shape is best seen in FIGS. 3 and 4 wherein sidewalls 34 and 36 converge from the rear or outer end portion 54 of jaw 22 toward the front end portion 24 so as to define between them an included angle B. Angle B may be selected from within the range of 1 to 10 degrees with a preferable range of 3 to 7 degrees. Of course, larger angles are possible up to thirty degrees or more.

Although the sidewalls 34,36 are shown to taper and converge toward one another in a direction toward front end portion 24 of jaw 22, it is also possible and in many cases preferable to reverse the direction of taper so that sidewalls 34,36 taper and converge toward one another in a direction toward the rear end portion 54. In this case, the corresponding longitudinal taper and convergence of groove 20 within base 14 must also be reversed. When the front end portion 24 of jaw 22 is subsequently tightened against a workpiece, the reaction force drives the tongue 22 even more tightly into and against groove 20 so as to further and more securely seat the jaw on its base.

In order to achieve the desired dual wedging action between tongue 22 and groove 20, the groove 20 in base 14 must be formed to match and complement the shape of tongue 22. As seen in FIGS. 7 through 11, and in particular in FIGS. 7 and 10, sidewalls 60,62 of groove 20 converge at the same rate as sidewalls 34,36 of tongue 22 so as to define between them an included angle B which is the same as that defined between sidewalls 34,36 of tongue 22.

Sidewalls 60,62 also converge toward one another as they extend upwardly and away from inner planar wall 64 which defines the bottom surface of groove 20. The upper portions of sidewalls 60,62 may be formed with chamfered edges 66,68 which respectively extend up to a pair of coplanar abutment surfaces 70,72. In this manner, each sidewall 60,62 defines an undercut region along inner wall 64 and below abutment surfaces 70,72. Abutment surfaces 70,72 extend along opposite sides of groove 20 and are aligned in a common plane which is generally parallel to the inner planar wall 64 of groove 20.

Figure 9:
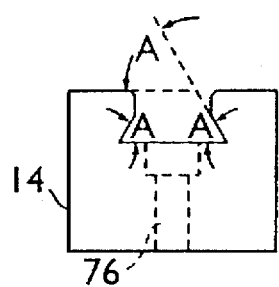
FIG. 9 is a front end view of the base of FIG. 7.
Figure 10:
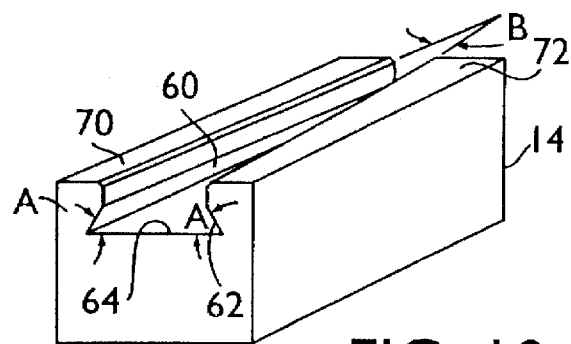
FIG. 10 is a perspective view of the base of FIG. 7.

Sidewall 62 extends upwardly along base 14 so as to define an included angle A with respect to inner wall 64 and with respect to planar abutment surface 70 as seen in FIGS. 9 and 10. In a similar manner, sidewall 60 extends upwardly from base 14 so as to define an included angle A with respect to inner wall 64 and with respect to planar abutment surface 72.

The angle A defined by each converging sidewall 60,62 on base 14 is set equal to each corresponding angle A defined by each diverging sidewall 34,36 on tongue 22. Angle A can be selected from within the range of about 10 to 80 degrees with a preferred range being 50 to 70 degrees.

Countersunk threaded bores 74,76 are formed through inner wall 64 of base 14 for receiving threaded fasteners which fasten base 14 to chuck 10 in a known manner. In use, base 14 may remain fixed to chuck 10 while different jaws 16 may be mounted and removed from the base as described below.

One manner of using the quick change jaw assembly 12 is, as previously noted, to mount base 14 to chuck 10 and to subsequently mount various jaws 16 to the base. This is effected by simply inserting the front end portion 24 of tongue 22 into the rear end portion 80 of groove 20, placing abutment surfaces 26,28 on the jaw 16 into respective contact with the matching abutment surfaces 70,72 on base 14 and sliding the tongue longitudinally into the groove.

Figure 11:
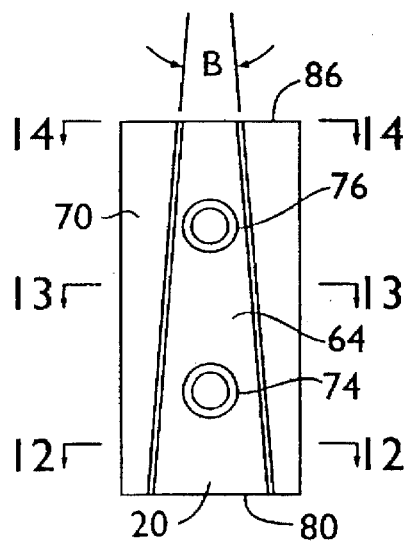
FIG. 11 is a top plan view of the base of FIG. 7.
Figure 12:
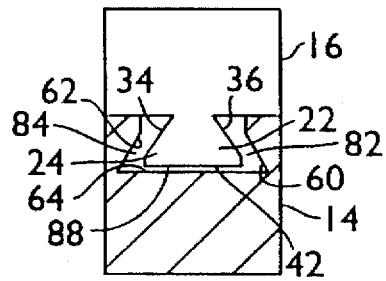
FIG. 12 is a front end view of the jaw of FIG. 4 and a sectional view through line 12—12 of the base of FIG. 11 with the front end portion of the jaw positioned over the rear end portion of the base along sectional line 12—12.

As seen in FIG. 12, when the front end portion 24 of tongue 22 is aligned along section line 12—12 of FIG. 11, a relatively wide clearance space or gap 82 is formed between the parallel confronting sidewalls 36 and 60. A virtually identical gap 84 is formed between confronting parallel sidewalls 34 and 62.

Figure 13:
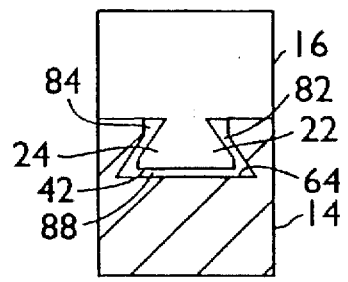
FIG. 13 is a view similar to FIG. 12 but showing a further stage of installation wherein the front end portion of the jaw is positioned over a central portion of the base along line sectional 13—13 of FIG. 11.

As the tongue 22 is moved further within groove 20 toward its front or narrow end 86 and is positioned over section line 13—13 of FIG. 11, as depicted in FIG. 13, the clearances 82,84 decrease. However, the clearance or gap 88 between surface 42 of tongue 22 and inner wall 64 of groove 20 remains essentially constant. The height of tongue 22 is dimensioned less than the depth of groove 20 in order to maintain a constant clearance 88 for reasons explained below.

When the jaw 16 is fully seated in base 14, the front end portion 24 of tongue 22 is positioned over the front end portion 86 of base 14 as shown in FIG. 14. At the same time, the rear end portion 90 of tongue 22 is positioned over the rear end portion 80 of groove 20 as shown in FIG. 15. Clearance or gap 88 remains constant.

As the confronting sidewalls between the tongue and groove initiate contact just before becoming fully engaged and interlocked, a dual wedging action occurs which applies a transverse or horizontal pinching force as well as vertical or downward pushing force on the sidewalls of the tongue 22. That is, as seen in FIG. 14, when the forward longitudinal movement of tongue 22 into groove 20 is initially impeded by the virtual planar contact between the sidewalls of the tongue and the sidewalls of the groove, the forward longitudinal pushing force applied to the tongue is reacted by a frictional force F which is directed substantially perpendicular to the planar abutting interfaces defined between the sidewalls of the tongue and groove.

As shown by the force resolution arrows 92,94, force F results in the application of a vertical or downward component of force 92 which pushes both sidewalls 34,36 of the tongue 22 downwardly into groove 20 toward inner wall 64. At the same time, force 92 also pulls the abutment surfaces 26,28 of the jaw downwardly into locking planar contact with abutment surfaces 70,72 of base 14.

Clearance 88 ensures that the full magnitude of force 92 is applied between these abutment surfaces on the jaw and base by allowing full unrestricted downward movement of the tongue within the groove. Additional locking force can be applied by clamping the jaw against a workpiece so as to drive the tongue 22 further into groove 20 and wedge the tongue even more tightly within the groove.

While the vertical component 92 of force F holds the respective abutment surfaces in tightly clamped contact and tends to center the tongue within the groove, the horizontal or transverse forces 94 act in opposite directions to positively center and align the tongue within the groove. The overall result is an extremely tight and accurate interfit between the tongue and groove.

In those cases where the front end portion 24 of the jaw is provided over the wide end of its dovetail such that the dovetail tapers and converges in a direction away from the tool or workpiece being gripped by the jaw, the application of an additional tool or workpiece clamping force, such as provided by a hydraulic chuck, will cause the jaw to become even more tightly wedged within groove 20. All that is required to quickly and easily remove the jaw from its base is a moderate impact with a hammer in a longitudinal direction driving the tongue out of its wedged interfit.

Another embodiment of the invention is shown in FIGS. 16 and 17 wherein base 14 in FIG. 16 is formed with two longitudinally spaced dovetail-shaped undercuts 98,100 separated by a central opening 102. The mating jaw 16 in FIG. 17 is formed with a pair of longitudinally separated dovetails 104,106 which slide into and become wedged within the undercuts of the base as described in the previous examples. A thin central rib 108 interconnects the two dovetails on the jaw.

There has been disclosed heretofore the best embodiment of the invention presently contemplated. However, it is to be understood that various changes and modifications may be made thereto without departing from the spirit of the invention. For example, instead of undercutting groove 20 along both its sidewalls so as to form a full dovetail groove, a single undercut may be used as in FIG. 18. The other sidewall may be perpendicular to its upper abutment surfaces so as to form a right angle at 110. In this case, a very short insertion distance of less than 0.25 inch can be provided for fully seating the tongue in the groove.

What is claimed:

1. A chuck jaw assembly, comprising:
   a base;
   a jaw removably mounted to said base; and
   a double-tapered tongue and groove interconnection provided between said base and said jaw for mounting said jaw on said base, said interconnection comprising a tapered tongue having a pair of converging sidewalls, a complementary-tapered groove having an inner floor and a pair of groove sidewalls converging along opposite sides of said groove and receiving said tongue sidewalls therein with a transversely wedged interfit, at least one undercut extending longitudinally along said groove, and one of said sidewalls projecting into said undercut and wedged into said groove and forced toward said inner floor by abutment along said undercut, and wherein said tongue is spaced apart from said inner floor of said groove.

2. The assembly of claim 1, wherein said base comprises an abutment surface and said jaw comprises an abutment surface and wherein said abutment of said one tongue sidewall along said undercut clamps said abutment surfaces of said tongue and groove together.

3. The assembly of claim 1, wherein said tongue is provided on said jaw.

4. The assembly of claim 1, wherein said at least one undercut comprises a pair of undercuts formed along opposite sides of said inner floor and wherein said tongue sidewalls are respectively wedged against said pair of undercuts.

5. The assembly of claim 1, wherein said tongue comprises a dovetail tongue and said groove comprises a dovetail groove.

6. The assembly of claim 1, wherein said undercut forms an angle of between 50 to 70 degrees with said inner floor of said groove.

7. The assembly of claim 1, wherein said converging tongue sidewalls define between them an included angle of 1 to 10 degrees.

8. The assembly of claim 1, wherein said jaw is mounted to said base solely by said wedged interfit.

9. A chuck jaw mountable to a base, comprising:
   a first end portion;
   a second end portion spaced longitudinally from said first end portion;
   a pair of abutment surfaces located between said first and second end portions for mounting said jaw to said base;
   first and second side surfaces extending longitudinally between said first and second end portions; and
   a tongue projecting outwardly from between said abutment surfaces for connecting said jaw to said base, said tongue comprising a compound dovetailed wedge having a first wedge extending longitudinally between said front and rear end portions, said first wedge comprising a pair of longitudinally converging sidewalls for centering said jaw on said base, and a second wedge extending transverse to said first wedge, said second wedge defined by said sidewalls diverging laterally from between said abutment surfaces for clamping said base between said abutment surfaces and said sidewalls.

10. The chuck jaw of claim 9, wherein said sidewalls define between them an included angle of between 1 to 10 degrees.

11. The chuck jaw of claim 9, wherein said sidewalls respectively diverge from said abutment surface at an angle of between 50 to 70 degrees.

12. A chuck jaw base, comprising:
    a front end portion;
    a rear end portion;
    an abutment for engaging a chuck jaw; and
    a pair of walls extending longitudinally between said front and rear end portions, said walls defining a first longitudinally converging wedge shaped dovetail groove and wherein said walls diverge away from said rear end portion.

13. The base of claim 12, wherein said walls define an included angle of between 1 to 10 degrees.

14. The base of claim 12, wherein said walls converge toward said abutment.

15. A chuck jaw assembly, comprising:
    a base;
    a jaw removably mounted to said base; and
    a double-tapered tongue and groove interconnection provided between said base and said jaw for mounting said jaw on said base, said interconnection comprising a tapered tongue having a pair of converging sidewalls, a complementary tapered groove having an inner floor and a pair of groove sidewalls converging along opposite sides of said groove and receiving said tongue sidewalls therein with a transversely wedged interfit, at least one undercut extending longitudinally along said groove, and one of said sidewalls projecting into said undercut and wedged into said groove and forced toward said inner floor by abutment along said undercut, and wherein said tongue is spaced apart from said inner floor of said groove, and wherein said jaw comprises a front end portion and a rear end portion and wherein said tongue sidewalls converge from said front end portion toward said rear end portion.

* * * * *